May 5, 1964
H. B. GROW
3,131,593
KALEIDOSCOPE
Filed Dec. 27, 1961
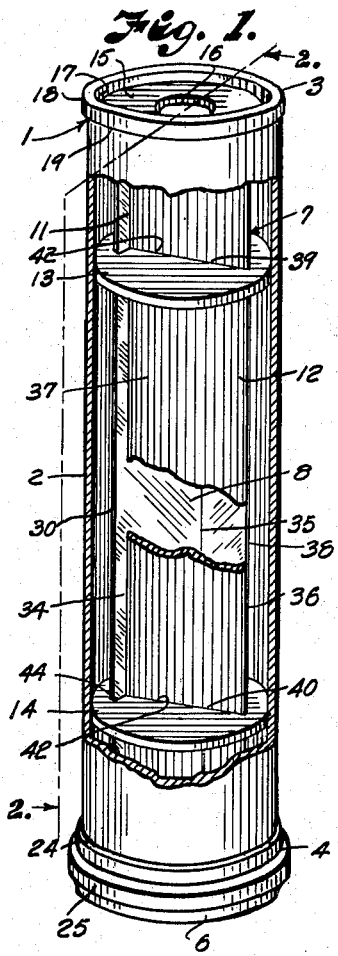
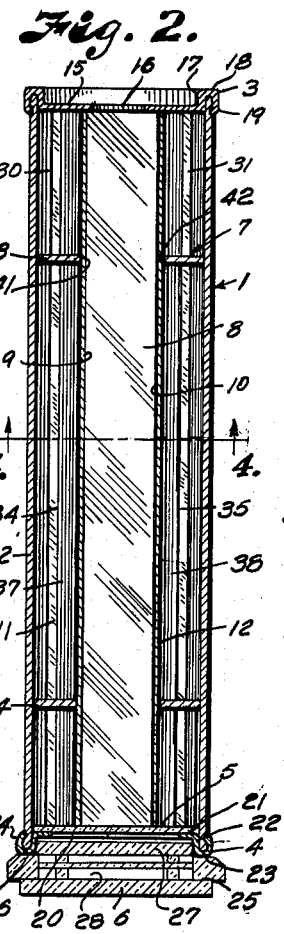
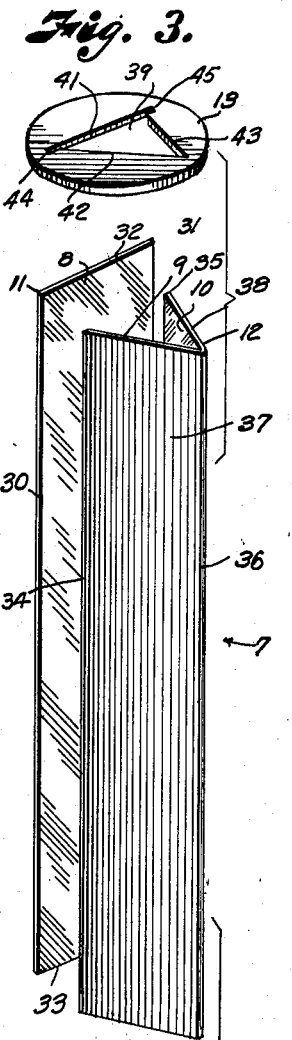
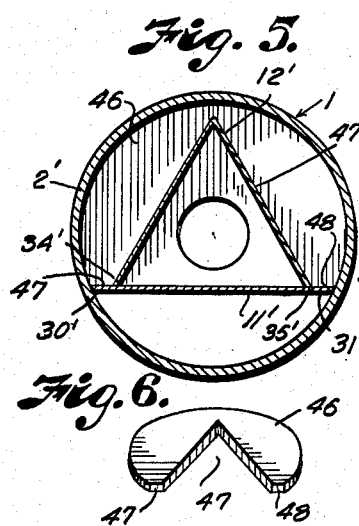
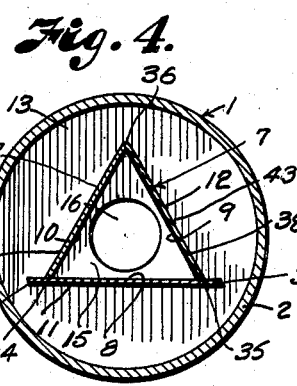
INVENTOR.
Harlow B. Grow
BY
Paul E. Mullendore
ATTORNEY

United States Patent Office 3,131,593
Patented May 5, 1964

3,131,593
KALEIDOSCOPE
Harlow B. Grow, 16530 Chattanooga Place,
Pacific Palisades, Calif.
Filed Dec. 27, 1961, Ser. No. 162,413
3 Claims. (Cl. 88—15)

This invention relates to kaleidoscopes, particularly the type employing three mirror elements, and has for its principal object to provide a simplified construction and support of the mirror elements in accurate permanent assembly within the tube of the kaleidoscope.

Three-mirror kaleidoscopes are desirable, but they have not been in widespread use because of difficulty in accurately grouping and supporting three mirror elements. For example, it has been proposed to form the mirrors from a thin sheet of mirror material divided into three panels of equal width by parallel scores and folding thereof on the scores to bring the side edges of the sheet together for retention by the tubular casing, when the mirror elements are placed therein. However, such construction has not been successful because the material does not bend accurately along both scores and the side edges will not entirely close along the length thereof. Also, there was no simple means to retain the edges in properly fixed registry, even should the bends be accurately produced.

With this in mind, I have provided a method of forming the mirrors and accurately retaining them in assembly within the tubular casing of the kaleidoscope in a simple and easy manner.

Other objects of the invention are to provide a quality instrument that can be inexpensively produced, so that it may be sold at low cost, and to provide a mirror assembly capable of producing more intricate and interesting patterns.

In accomplishing these and other objects of the invention, I have provided improved structure, the preferred forms of which are illustrated in the accompanying drawing, wherein:

FIG. 1 is a perspective view of a kaleidoscope constructed and assembled in accordance with the present invention, a part of the tubular casing being broken away to better illustrate the construction of the mirror unit.

FIG. 2 is a longitudinal section through the kaleidoscope taken on the line 2—2 of FIG. 1.

FIG. 3 is a perspective view of the parts composing the mirror unit, shown in disassembled, spaced apart relation.

FIG. 4 is an enlarged cross section on the line 4—4 of FIG. 2, and viewed in the direction of the arrows.

FIG. 5 is a similar cross sectional view through a modified form of the invention.

FIG. 6 is a perspective view of one of the supports employed in the modified form of the invention shown in FIG. 5.

Referring more in detail to the drawing, and first to the form of the invention illustrated in FIGS. 1 to 4 inclusive:

1 designates a preferred form of kaleidoscope constructed and assembled in accordance with the present invention. The kaleidoscope comprises a cylindrical tubular casing 2, having an eyepiece 3 at one end and a ring 4 at the opposite end. The ring 4 supports a transparent disk 5 and a removable capsule 6 for containing the fragments to produce symmetrical patterns when the kaleidoscope is in use.

Positioned within the tubular casing 2 is a mirror assembly 7, having mirror surfaces 8, 9 and 10 of equal effective dimensions and arranged uniformly about the axis of the tubular casing, with the reflecting surfaces positioned on 60° angles with respect to each other. The mirror assembly is composed of two parts 11 and 12 secured together and axially positioned within the casing by spaced apart supporting members 13 and 14.

The tubular casing 2 may be formed of any suitable material, such as a cylindrical cardboard tube or the like, having the desired length and diameter to contain the mirror assembly including the supporting members 13 and 14. The eyepiece 3 comprises a disk 15 having an axial aperture 16. The disk 15 also has a peripheral flange 17 inset within the open end of the tube and which terminates in an outwardly directed flange 18 that is crimped against the body of the casing, as indicated at 19. The ring 4 is of similar construction, but has a larger axial opening 20 to expose the capsule 6 and provide an annular ledge 21 to support the transparent disk 5. The ring 4 also has a peripheral flange 22 inset within the other open end of the tube and which has an outwardly directed flange 23 secured to the outer face of the tubular casing by a crimp 24.

The construction of the capsule 6 forms no part of the present invention, but is shown as a hollow body 25 having an annular shoulder 26 to provide an attaching portion 27 that is pressed into the ring 4 to retain the capsule on the end of the tubular casing. The capsule also has an internal chamber 28 for containing various fragments and materials for composing the kaleidoscopic patterns when the kaleidoscope is in use.

In accordance with the present invention, the part 11 of the mirror assembly 7 includes a flat strip of sheet material, such as aluminum of light gauge but sufficiently rigid to retain its flat shape. The part 11 of the mirror assembly has parallel side edges 30 and 31 and end edges 32 and 33 arranged to abut against the disk portion of the eyepiece 3 and against the transparent disk 5. The part 11 has a plane reflecting portion to provide the mirror surface 8, to cooperate with the mirror portions 9 and 10 of the mirror part 12.

The mirror part 12 is also formed of a strip of material which may be aluminum or the like, having parallel side edges 34 and 35 and a median longitudinal bend 36, to provide flat diverging planar wings 37 and 38, diverging on an angle of 60°. The planar wings 37 and 38 are of equal width and the edges 34 and 35 are spaced apart a distance equal to the width of one of the wings, so that when the edges 34 and 35 seat the reflecting surface of the mirror part 11, the mirror portions are therefore all of equal width and form angles of 60° with respect to each other, as clearly shown in FIG. 4.

The mirror elements thus formed are easily and accurately produced, since the single bend 36 of the mirror part 12 may be accurately formed with respect to a median line between the edges 34 and 35 and the bend is readily set to retain the angle of 60° between the wing portions 37 and 38, consequently, since the edges 34 and 35 and fold or bend 36 are parallel, they will automatically provide angles of 60° when they are in effect capped by the wider mirror part 11, and the edges 34 and 35 will seat the part 11 throughout the length thereof.

In order to retain the mirror parts in contacting relationship, the supporting members 13 and 14 comprise disk-like bodies which may be formed of cardboard or suitable material and which have an outer diameter to be snugly slidable within the tubular casing 2. Each of the supporting members 13 and 14 have inner triangular openings 39 and 40 of generally equilateral shape to provide edges 41, 42 and 43 for closely engaging and backing the outer faces of the mirror parts 11 and 12. In order to accommodate the projecting edges 30 and 31 of the mirror part 11, each triangular opening 39 and 40 has slots 44 and 45 projecting outwardly therefrom at the ends of the edge 41, as best shown in FIG. 3.

In assembling the kaleidoscope, the mirror parts 11 and 12 are brought together with the mirror surfaces thereof in facing relation and with the edges 30 and 31 projecting equal distances from the edges 34 and 35 of the mirror part 12 so that the marginal portions seat thereon. The supporting members or disks 13 and 14 are then slid over the ends of the assembled mirror parts, with the ends of the assembled parts sliding through the triangular openings 39 and 40, with the projecting edges 30 and 31 sliding through the slots 44 and 45. When the supporting members are in place, the mirror elements are encompassed by and are bound by the tight fit within the openings 39—40. When thus retained, the effective mirror surfaces thereof are all of equal width and the angles therebetween are identical, namely, 60° with respect to each other. The mirror assembly thus formed is pushed through one end of the tubular casing 2, after which the transparent disk 5 is moved through one end of the tube to seat against the ends of the mirror parts 11 and 12. The eyepiece 3 and ring 4 are then applied so that the ring 4 seats against the transparent disk and the disk portion of the eyepiece 3 seats against the opposite ends of the mirror parts. The outwardly extending flanges are then crimped over the outer face of the tubular casing, as shown at 18 and 2e, FIG. 2.

In the form of the invention shown in FIG. 5, the mirror parts are identical in shape with the mirror parts 11 and 12 of the form of the invention just described, with the exception that the effective surfaces thereof are of greater width by reason of the type of supporting members 46 employed in this form of the invention. In this form of the invention, the supporting members 46 comprise segments of circular disks having V-shaped notches 47 conforming with the outer faces of the diverging plane portions of the mirror part 12', to cooperate with the strip mirror part 11' in retaining the mirror elements in concentric relation within the tubular casing 2', the supporting members 46 being flattened as at 47 and 48 to abut against the end of the strip, as best shown in FIG. 5. In this form of the invention, the supporting members 46 are applied over the diverging portions of the mirror part 12' so that the flattened portions 47 and 48 register with the side edges 30' and 31'. The strip is then placed in position against the side edges 34' and 35' of the mirror part 12' and the entire assembly is slid into one end of the tubular casing. When in position in the tube, the support members firmly bind the mirror parts in their proper coaxial relation therein, because of the relatively tight fit of the supporting members in the tubular casing and by the fact that the edges of the mirror part 11' are clamped between the edges 47—48 of the supports and the curved side of the casing 2. The eyepiece and capsule retaining ring at the opposite ends of the tubular casing are of the same construction and secured in the same manner as previously described.

Kaleidoscopes constructed and assembled as described are easily manufactured with inexpensive parts and readily assembled with accuracy when the parts are brought into assembly, so that a high quality, three-mirror kaleidoscope may be supplied at low cost.

The kaleidoscope is used in the manner of any kaleidoscope by placing the eye to the eyepiece and holding the capsule end in the light. The kaleidoscope is then turned on its longitudinal axis to cause the fragments in the capsule to present variously changing intricate patterns when images thereof are reflected in the mirrors.

What I claim and desire to secure by Letters Patent is:
1. A kaleidoscope including
a cylindrical casing having an eye piece at one end and a capsule containing fragments at the other end, and
a mirror assembly extending longitudinally within the cylindrical casing from the eye piece to the capsule,
said mirror assembly comprising a strip of sheet material having a reflecting surface on one face side and having a longitudinal median fold to provide wings diverging from said fold on the reflecting face side and forming angularly facing mirror portions having free longitudinal outer edges providing parallel seats spaced apart from each other in correspondence with the width of said mirror portions,
a second strip of sheet material having a similar reflecting surface with marginal sides of the reflecting surface thereof lapping said seats to provide a third mirror portion of the size of the first mirror portions to cooperate with the first mirror portions in reflecting images of said fragments in a symmetrical pattern about the axis of the cylindrical casing, and
disk members closely fitting transversely within the cylindrical casing near said eye piece and capsule respectively with outer peripheral portions closely engaging the cylindrical casing and having inner edges engaging said strips of sheet material to hold the mirror portions thereof in fixed symmetrical assembly about the axis of said cylindrical casing.
2. A kaleidoscope as described in claim 1,
in which said wings of the first strip and said second strip are arranged on chordal planes extending through the cylindrical casing with the longitudinal fold of the first strip and edges of the second strip spaced from the inner circumferential face of the cylindrical casing, and
the disk members are of a size to fit transversely within the cylindrical casing and each disk member has a triangular opening to provide the inner edges for backing said strips of sheet material.
3. A kaleidoscope as described in claim 1,
wherein said edges of the second strip project a sufficient distance from said seats to engage the inner surface of said cylindrical casing, and
the disk members each have a notch to provide the backing for said wings of the folded strip and to cooperate with the projecting edges of the second strip in holding the mirror portions in fixed symmetrical assembly about the axis of the cylindrical casing.

References Cited in the file of this patent
UNITED STATES PATENTS

| | | |
|---|---|---|
| 862,438 | Boehm | Aug. 6, 1907 |
| 1,010,808 | Scheufler | Dec. 5, 1911 |
| 1,294,967 | Stabla | Feb. 18, 1919 |
| 1,485,795 | Mallernee | Mar. 4, 1924 |
| 2,454,577 | Smith | Nov. 23, 1948 |

FOREIGN PATENTS

| | | |
|---|---|---|
| 331,441 | Germany | May 21, 1920 |